(12) United States Patent
Firnhaber et al.

(10) Patent No.: US 9,233,329 B2
(45) Date of Patent: Jan. 12, 2016

(54) GAS-LIQUID SEPARATION METHOD AND SEPARATOR THEREFOR

(71) Applicant: Vanair Manufacturing, Inc., Michigan City, IN (US)

(72) Inventors: Mark A. Firnhaber, Laporte, IN (US); Garrett M. Griggs, Westville, IN (US); Todd Allen Zeigner, New Carlisle, IN (US); Eugene A. Tibbs, Sr., Laporte, IN (US)

(73) Assignee: Vanair Manufacturing, Inc., Michigan City, IN (US)

( * ) Notice: Subject to any disclaimer, the term of this patent is extended or adjusted under 35 U.S.C. 154(b) by 65 days.

(21) Appl. No.: 14/197,444

(22) Filed: Mar. 5, 2014

(65) Prior Publication Data

US 2014/0251142 A1    Sep. 11, 2014

Related U.S. Application Data

(60) Provisional application No. 61/772,693, filed on Mar. 5, 2013.

(51) Int. Cl.
*B01D 45/16* (2006.01)
*B01D 46/00* (2006.01)
*B01D 50/00* (2006.01)

(52) U.S. Cl.
CPC .............. *B01D 45/16* (2013.01); *B01D 46/003* (2013.01); *B01D 50/002* (2013.01)

(58) Field of Classification Search
CPC ............. B01D 17/0211; B01D 17/045; B01D 19/0042; B01D 21/10; B01D 21/2405; B01D 21/2494; B01D 21/34
USPC .................................. 95/24, 253; 96/157, 184
See application file for complete search history.

(56) References Cited

U.S. PATENT DOCUMENTS

| | | | | |
|---|---|---|---|---|
| 4,329,159 A * | 5/1982 | Bull | | 204/563 |
| 5,132,011 A * | 7/1992 | Ferris | | 96/184 |
| 6,315,898 B1 * | 11/2001 | Bull | | 210/187 |
| 7,531,099 B1 * | 5/2009 | Rhodes | | 210/800 |
| 8,470,080 B1 * | 6/2013 | Ball et al. | | 95/253 |
| 2013/0341333 A1 * | 12/2013 | Herdman et al. | | 220/567.2 |

* cited by examiner

*Primary Examiner* — Duane Smith
*Assistant Examiner* — Minh-Chau Pham
(74) *Attorney, Agent, or Firm* — Hartman Global IP Law; Gary M. Hartman; Michael D. Winter

(57) ABSTRACT

Methods and separator suitable for separating a gas from a liquid within a gas-liquid mixture. The separator includes a tank having a sidewall and oppositely-disposed endwalls that enclose an interior of the tank. An inlet to the tank directs a gas-liquid mixture against the sidewall of the tank within a first primary separation section to impart a circumferential flow direction to the mixture along the sidewall and initiate separation of a gas and liquid from the mixture. A reservoir located in a lower region of the tank collects the liquid separated from the mixture. A passage within a second primary separation section receives the gas separated from the gas-liquid mixture through an entrance thereof located in an upper region of the tank, and the passage directs flow of the gas into a secondary separation section, from which the gas exits the tank through an outlet.

22 Claims, 2 Drawing Sheets

GAS-LIQUID SEPARATION METHOD AND SEPARATOR THEREFOR

CROSS REFERENCE TO RELATED APPLICATIONS

This application claims the benefit of U.S. Provisional Application No. 61/772,693, filed Mar. 5, 2013, the contents of which are incorporated herein by reference.

BACKGROUND OF THE INVENTION

The present invention generally relates to methods and systems adapted to separate a gas from a liquid within a gas-liquid mixture, a nonlimiting example being a mixture of air and oil that may be utilized in combination with an oil-flooded rotary compressor.

Centrifugal separation techniques performed within vertical tanks are well known in the compressor industry. However, vertical tanks impose certain restrictions in terms of where they can be installed. For example, due to the size and/or orientation, vertical tanks can be difficult to implement in under-deck compressor applications for vehicles, including a wide variety of municipal, emergency and military vehicles.

BRIEF DESCRIPTION OF THE INVENTION

The present invention provides methods and separators suitable for separating a gas from a liquid within a gas-liquid mixture.

According to one aspect of the invention, a gas-liquid separator is provided that includes a tank having a sidewall that surrounds an interior of the tank and oppositely-disposed endwalls that enclose the interior of the tank. The tank comprises at least a first primary separation section, a second primary separation section, and a secondary separation section that are fluidically aligned within the tank so that flow through the interior of the tank proceeds through the first primary separation section, and then through the second primary separation section, and then through the secondary separation section. An inlet to the tank is adapted to direct a gas-liquid mixture against the sidewall of the tank within the first primary separation section to impart a circumferential flow direction to the gas-liquid mixture along the sidewall that initiates separation of a gas and a liquid from the gas-liquid mixture. A reservoir is located in a lower region of the interior of the tank within the first and second primary separation sections. The reservoir is adapted to collect the liquid that was separated from the gas-liquid mixture within the first primary separation section. A flow baffle partially separates the first and second primary separation sections but not the reservoir therein, and a means is provided for withdrawing the liquid collected in the reservoir. A passage within the second primary separation section is adapted to receive the gas that was separated from the gas-liquid mixture within the first primary separation section. The passage has an entrance located in an upper region of the tank, and the passage directs the flow of the gas into the secondary separation section. An outlet is adapted to allow the gas to exit the secondary separation section and the tank.

According to another aspect of the invention, a method is provided for separating a gas and a liquid within a gas-liquid mixture. The method includes directing the gas-liquid mixture against a sidewall of a tank that surrounds an interior of the tank, so that the gas-liquid mixture is directed to impart a substantially downward circumferential flow direction to the gas-liquid mixture along the sidewall that initiates separation of the gas and the liquid from the gas-liquid mixture. The gas-liquid mixture and the gas and the liquid separated therefrom is impacted against an amount of the liquid pooled within a lower region of the interior of the tank so as to collect the liquid that was separated from the gas-liquid mixture. The liquid collected in the reservoir is withdrawn from the tank, and the gas that was separated from the gas-liquid mixture flows around a flow baffle and is then received within a passage having an entrance located in an upper region of the tank. The passage directs the flow of the gas into a secondary separation section of the tank where at least a portion of any liquid entrained in the gas is removed, and the gas is allowed to exit the tank from the secondary separation section.

Technical effects of the system and method described above preferably include the capability of performing an air-oil separation process within a tank that is compact and horizontally oriented, enabling the system and method to be implemented in various installations, for example, under-deck compressor applications for vehicles, including municipal, emergency and military vehicles.

Other aspects and advantages of this invention will be further appreciated from the following more detailed description.

DETAILED DESCRIPTION OF THE INVENTION

Figure 1:
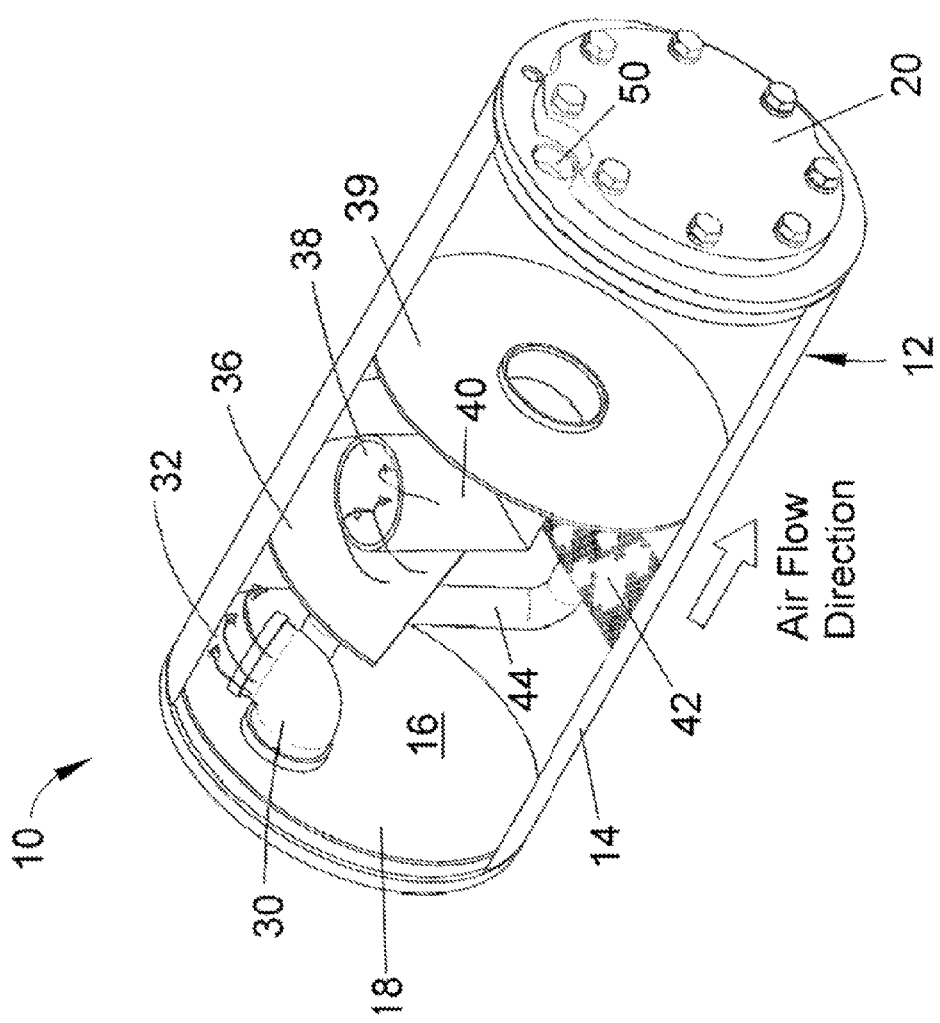
FIG. 1 represents a perspective view of a gas-liquid separator with a wall portion removed to reveal internal components of the separator.
Figure 2:
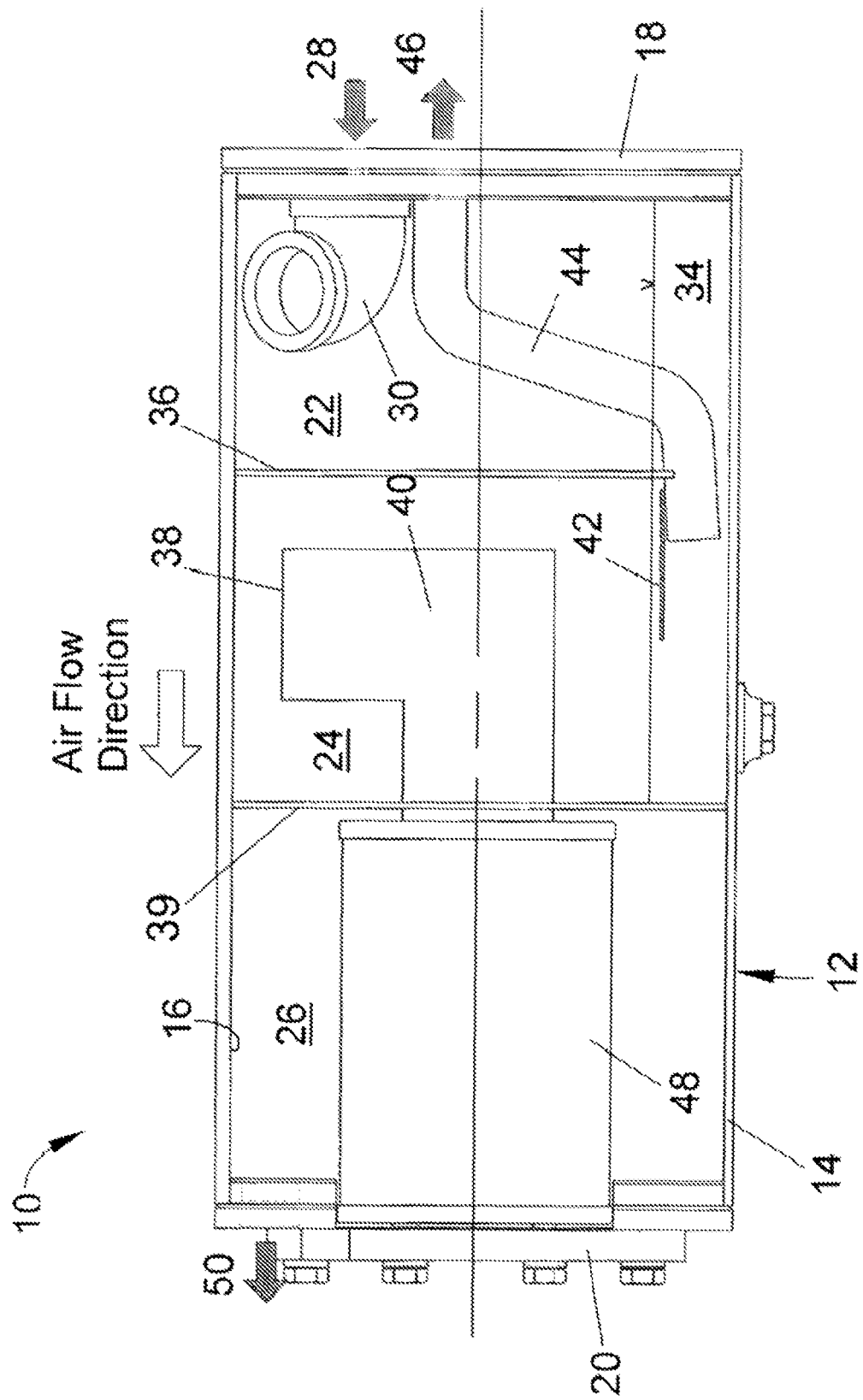
FIG. 2 represents a side cross-sectional view of the separator of FIG. 1.

As seen in FIGS. 1 and 2, a gas-liquid separator 10 is provided that is capable of separating a wide variety of gases and liquids, a particular but nonlimiting example being air and oil, for example, for use in combination with an oil-flooded rotary compressor. The separator 10 is able to make use of a horizontally-oriented tank ("horizontal tank") 12, such that the separator 10 is capable of addressing installation issues common with vertical tanks when used in certain applications, for example, under-deck compressor applications for vehicles, including a wide variety of municipal, emergency and military vehicles. The following discussion will refer to the use of the separator 10 to separate air and oil, though it should be understood that the invention is not limited to operations on these two fluids.

As evident from FIGS. 1 and 2, the tank 12 has a substantially tubular-shaped sidewall 14 that defines an axis and an interior 16 that is largely closed by two endwalls 18 and 20. The interior of the tank 12 is preferably divided into at least three sections 22, 24 and 26 that, as a result of the tubular shape of the tank 12, are axially aligned with each other. Two of the sections (22 and 24) will be referred to herein as primary separation sections, while the third section 26 will be referred to herein as a secondary separation section. The separator 10 is able to make use of a horizontally-oriented tank ("horizontal tank") 12, whose axially-aligned separation sections 22, 24 and 26 create a generally horizontal flow direction through the separator 10, as indicated by the "Air Flow Direction" arrow in FIGS. 1 and 2. With this arrangement, an air-oil mixture (e.g., oil entrained in air) enters the tank 12 through an air/oil inlet 28 (FIG. 2) in one of the endwalls 18, and air exits the tank 12 through a dry air outlet 50 (FIGS. 1 and 2) preferably located in the opposite endwall 20. While a substantially tubular-shaped tank 12 is represented for the embodiment shown in FIGS. 1 and 2 and is advantageous from a functional and structural standpoint, it should be understood from the following discussion that such a shape is not strictly required for the tank 12.

As shown in FIGS. 1 and 2, an air-oil mixture that enters the tank 12 through the inlet 28 encounters an elbow 30 located within the first primary separation section 22. The elbow 30 is adapted and oriented to redirect the flow of the mixture from a generally axial direction to a generally circumferential direction 32, directing the mixture against the inner curved (circular) surface of the sidewall 14 of the tank 12. The elbow 30 is represented as redirecting the flow from the inlet 28 approximately 90-degree, though this is not a requirement. For example, the flow could enter tangentially through the sidewall 14 of the tank 12 to achieve the same or similar effect. The mixture is thus caused to flow circumferentially against the curved inner surface of the sidewall 14, and eventually downward toward a lower region of the tank interior 16. By providing a sufficient entry velocity for the air-oil mixture, which can be ascertained through experimentation, separation of oil from the air initiates when the mixture impinges the sidewall 14 and continues as the mixture flows along a circumferential or arcuate path established by the arcuate contour of the inner surface of the sidewall 14. Flow of the separated air and oil and the mixture as a whole continues in the circumferential direction 32 until a liquid pool 34 (in this example, of oil) is encountered that has collected within a reservoir defined by the primary separation sections 22 and 24 within a lower region of the tank 12 (FIG. 2), at which point the separated oil rapidly decelerates and collects within the pool 34. A centrifugal flow baffle 36 directs the flow of the initial mixture and its separated oil and air constituents along a contained path to promote the completion of its centrifugal flow motion within the primary separation section 22. As seen in FIG. 1, the centrifugal flow baffle 36 may have a semicircular shape, and is preferably positioned and angled to help constrain and redirect the flow of the mixture at its entry point (the outlet of the elbow 32) into the tank 12. The baffle 36 also serves as a partition between the primary separation sections 22 and 24 of the tank 12, but preferably does not entirely separate the sections 22 and 24. In particular, the baffle 36 preferably does not separate the reservoir and its pool 34 within and shared by the sections 22 and 24, as evident from FIGS. 1 and 2.

Because gasses (air in this example) are much less dense than fluids (oil in this example), the air separated from the mixture as the mixture circumferentially flows along the sidewall 14 does not collect within the pool 34, but instead continues to flow circumferentially and eventually around the baffle 36 into the second primary separation section 24. Within this section 24, the air flows through an entrance 38 defined by a passage 40, which redirects the flow of air as it flows within the section 24. As represented in FIGS. 1 and 2, the entrance 38 to the passage 40 is closer to the sidewall 14 than to the axis of the tank 12, and therefore within the upper region of the tank 12. As a nonlimiting example, the entrance 38 may be approximately one inch (about 2.5 cm) from the sidewall 14. The entrance 38 to the passage 40 is spaced from the sidewall 14 to allow air to freely enter the passage 40, while minimizing the amount of oil that might otherwise enter the passage 40 as a result of sloshing or splashing of the oil within the reservoir, for example, as might occur if the separator 10 is installed on a vehicle and the vehicle is in motion. As such, there is a significantly reduced risk of oil entering the secondary separation section 26 of the tank 12. In addition, a perforated baffle 42 is preferably located in the lower region of the primary separation section 24 to assist in minimizing sloshing of oil within section 24. As represented in FIG. 2, the perforated baffle 42 is preferably oriented horizontally and positioned just below the surface of the pool 34 within the reservoir to help stabilize the oil and allow any remaining entrained air to exit the oil before the oil is drawn from the reservoir through a pick-up tube 44, via which the oil exits the tank 12 through an oil outlet 46 before being returned to, for example, a compressor. Oil flow and other system considerations downstream of the tank 12 may follow conventional practice employed by oil-flooded compressors.

Air that enters the passage 40 within the primary separation section 24 may be substantially free of oil, and more preferably is at least 99.9% free of oil. A high level of oil removal (separation) is made possible through the above described process. After entering the passage 40 through the entrance 38, the flow of substantially oil-free air is directed downward and then redirected by the passage 40 at approximately ninety degrees prior to entering the secondary separation section 26. As shown in FIGS. 1 and 2, the passage 40 delivers the air (with any remaining entrained oil) to the section 26 through an opening in a partition 39 at a location coinciding with the axis of the tank 12. Except for the passage 40, the partition 39 entirely separates the sections 24 and 26, such that air and any residual oil can only enter the section 26 through the passage 40. From the passage 40, the air enters a coalescing element 48 (shown in FIG. 2 only) within the secondary separation section 26, where any remaining oil preferably coalesces and is further separated from the air flow, preferably to a level of 1 ppm (parts per million by weight) or less. Oil coalescence and final separation within the coalescing element 48 may follow conventional industry practice, consistent with coalescing methods and elements of types known in the art. In the embodiment of the separator 10 shown in FIGS. 1 and 2, the coalescing element 48 can be removably placed within the section 26 through the endwall 20, which is removably mounted to the tank 12 with bolts or other suitable fastening means. Any oil that has coalesced within the coalescing element 48 drains therefrom into the lower region of the secondary separation section 26 of the tank 12, from which it is able to flow to a low pressure area of a compressor through any suitable means (not shown). The air, now preferably considered to be dry, is able to exit the secondary separation section 26 of the tank 12 through the outlet 50, shown as located in the endwall 20 opposite the air/oil tank inlet 28 and above the coalescing element 48. The air may be then allowed to enter a compressed air system, for example, on a vehicle where it may be used for its intended purpose.

While the invention has been described in terms of a specific embodiment, it is apparent that other forms could be adopted by one skilled in the art. For example, the separator 10 and its individual components could differ in appearance and construction from the embodiment shown in the Figures, the functions of each component could be performed by components of different construction but capable of a similar (though not necessarily equivalent) function, and various materials could be used in the construction of the separator 10 and its components. Accordingly, it should be understood that the invention is not limited to the specific embodiment illustrated in the Figures. It should also be understood that the phraseology and terminology employed above are for the purpose of disclosing the illustrated embodiment, and do not necessarily serve as limitations to the scope of the invention. Therefore, the scope of the invention is to be limited only by the following claims.

The invention claimed is:

1. A gas-liquid separator comprising:
   a tank having a sidewall that surrounds an interior of the tank and oppositely-disposed first and second endwalls that enclose the interior of the tank, the tank comprising at least a first primary separation section, a second primary separation section, and a secondary separation section that are fluidically aligned within the tank so that flow through the interior of the tank proceeds through the first primary separation section, and then through the second primary separation section, and then through the secondary separation section;
   an inlet through which a gas-liquid mixture enters the tank, the inlet being adapted to direct the gas-liquid mixture against the sidewall of the tank within the first primary separation section to impart a single circumferential flow direction to the gas-liquid mixture along the sidewall that initiates separation of a gas and a liquid from the gas-liquid mixture;
   a reservoir in a lower region of the interior of the tank within the first and second primary separation sections, the reservoir being adapted to collect a pool of the liquid that was separated from the gas-liquid mixture within the first primary separation section;
   a flow baffle that partially fluidically separates the first and second primary separation sections but not the reservoir therein, the flow baffle being configured to direct flow of the gas-liquid mixture and the gas and the liquid separated therefrom along a contained path to promote centrifugal flow along the sidewall of the tank;
   means for withdrawing the liquid collected in the reservoir;
   a passage within the second primary separation section, the passage being adapted to receive the gas that was separated from the gas-liquid mixture within the first primary separation section, the passage having an entrance located in an upper region of the second primary separation section of the tank, the passage directing the flow of the gas into the secondary separation section; and
   an outlet adapted to allow the gas to exit the secondary separation section and the tank.

2. The gas-liquid separator of claim 1, wherein the tank defines a horizontal flow direction through the separator between the inlet and the outlet thereof.

3. The gas-liquid separator of claim 1, wherein the first primary separation section, the second primary separation section, and the secondary separation section are axially aligned with each other.

4. The gas-liquid separator of claim 1, wherein the sidewall of the tank within the first primary separation section defines a curved inner surface against which the gas-liquid mixture is directed as it leaves the inlet to the tank.

5. The gas-liquid separator of claim 1, further comprising a second baffle within the second primary separation section and adapted to stabilize and inhibit sloshing of the pool within the reservoir therein.

6. The gas-liquid separator of claim 1, further comprising a coalescing element within the secondary separation section, the coalescing element receiving the gas from the passage and operable to further separate at least a portion of any of the liquid entrained in the gas before the gas exits the tank though the outlet.

7. The gas-liquid separator of claim 6, wherein the coalescing element is removable from the secondary separation section through the second endwall.

8. The gas-liquid separator of claim 1, wherein the gas-liquid separator is installed on a vehicle and the tank is oriented to be substantially horizontal.

9. The gas-liquid separator of claim 8, wherein the gas-liquid mixture is an air-oil mixture received from a compressor.

10. The gas-liquid separator of claim 9, wherein the compressor is an oil-flooded rotary compressor.

11. A method of separating a gas and a liquid within a gas-liquid mixture, the method comprising the steps of:
    directing the gas-liquid mixture against a sidewall of a tank that surrounds an interior of the tank within a first primary separation section of the tank, the gas-liquid mixture being directed to impart a single substantially downward circumferential flow direction to the gas-liquid mixture along the sidewall and initiate separation of the gas and the liquid from the gas-liquid mixture;
    impacting the gas-liquid mixture and the gas and the liquid separated therefrom against a pool of the liquid within a lower region of the interior of the tank and formed by collecting the liquid that was separated from the gas-liquid mixture, the pool being in a reservoir present in the first primary separation section and in a second primary separation section of the tank;
    withdrawing from the tank the liquid collected within the pool in the reservoir;
    flowing the gas that was separated from the gas-liquid mixture around a flow baffle that partially fluidically separates the first and second primary separation sections but not the reservoir therein, wherein the gas flows around the flow baffle and into the second primary separation section;
    receiving the gas within a passage having an entrance located in an upper region of the second primary separation section of the tank, the passage directing the flow of the gas from the second primary separation section into a secondary separation section of the tank where at least a portion of any liquid entrained in the gas is removed; and
    allowing the gas to exit the tank from the secondary separation section.

12. The method of claim 11, wherein the air within the tank flows in a horizontal flow direction through the separator between the inlet and the outlet thereof.

13. The method of claim 11, wherein the first primary separation section, the second primary separation section, and the secondary separation section are axially aligned with each other.

14. The method of claim 11, wherein the sidewall of the tank within the first primary separation section defines a curved inner surface against which the gas-liquid mixture is directed as it leaves the inlet to the tank.

15. The method of claim 11, further comprising stabilizing and inhibiting sloshing of the pool within the reservoir with a second baffle within the second primary separation section.

16. The method of claim 11, further comprising separating at least a portion of any of the liquid entrained in the gas with a coalescing element within the secondary separation section prior to the gas exiting the tank though the outlet.

17. The method of claim 16, further comprising installing and removing the coalescing element from the secondary separation section through the second endwall.

18. The method of claim 11, further comprising installing the gas-liquid separator on a vehicle so that the tank is oriented to be substantially horizontal.

19. The method of claim 18, wherein the gas-liquid mixture is an air-oil mixture received from a compressor.

20. The method of claim 19, wherein the compressor is an oil-flooded rotary compressor.

21. The gas-liquid separator of claim 1, wherein the passage directs the flow of the gas through a partition that fluidically separates the second primary separation section and the secondary separation section.

22. The method of claim 11, wherein the passage provides access for the gas through a partition that fluidically separates the second primary separation section and the secondary separation section.

* * * * *